United States Patent [19]

Saurenman

[11] Patent Number: 4,502,091
[45] Date of Patent: Feb. 26, 1985

[54] POSITIVE AND NEGATIVE ION DISTRIBUTOR BAR

[76] Inventor: Donald G. Saurenman, 6787 Worsham Dr., Whittier, Calif. 90602

[21] Appl. No.: 581,732

[22] Filed: Feb. 21, 1984

Related U.S. Application Data

[63] Continuation-in-part of Ser. No. 420,904, Sep. 21, 1982, which is a continuation-in-part of Ser. No. 369,925, Apr. 19, 1982, which is a continuation-in-part of Ser. No. 290,423, Aug. 6, 1981, Pat. No. 4,390,923, which is a continuation-in-part of Ser. No. 259,503, May 1, 1981, Pat. No. 4,388,667, which is a continuation-in-part of Ser. No. 241,684, Mar. 9, 1981, , which is a continuation-in-part of Ser. No. 124,242, Feb. 25, 1980, Pat. No. 4,282,830.

[51] Int. Cl.³ .............................................. H05F 3/06
[52] U.S. Cl. ................... 361/213; 361/215; 361/216; 361/220; 361/231
[58] Field of Search ............... 361/212, 213, 215, 216, 361/220, 229, 231, 232

[56] References Cited

U.S. PATENT DOCUMENTS

| | | |
|---|---|---|
| 1,480,573 | 3/1919 | Smith . |
| 1,489,425 | 4/1924 | Chapman .................... 361/213 |
| 2,043,217 | 6/1935 | Yaglon . |
| 2,231,324 | 2/1941 | Cromfton, Jr. . |
| 2,264,495 | 12/1941 | Wilner . |
| 2,565,454 | 8/1951 | MacKenzie et al. . |
| 2,585,799 | 2/1952 | Lawrence . |
| 2,641,804 | 6/1953 | Klein . |
| 2,765,975 | 10/1956 | Lindenblad . |
| 2,844,478 | 7/1958 | Hanley et al. . |
| 3,106,884 | 10/1963 | Dave et al. . |
| 3,203,809 | 8/1965 | Visness et al. . |
| 3,288,054 | 11/1966 | Weprin et al. . |
| 3,308,344 | 3/1967 | Smith et al. .................... 361/213 |
| 3,311,108 | 3/1967 | Cristofv et al. . |
| 3,324,515 | 6/1967 | West . |
| 3,358,289 | 12/1967 | Lee . |
| 3,396,703 | 8/1968 | Trussell . |
| 3,483,672 | 12/1969 | Jahnke . |
| 3,696,791 | 10/1972 | Saurenman . |
| 3,757,491 | 9/1973 | Gourdine . |
| 3,818,269 | 6/1974 | Stark . |
| 3,870,946 | 3/1975 | Sandorf . |
| 3,976,916 | 8/1976 | Saurenman . |
| 4,072,762 | 2/1978 | Rhodes ............................... 426/510 |
| 4,208,438 | 6/1980 | Saurenman . |
| 4,250,804 | 2/1981 | Saurenman . |
| 4,282,830 | 8/1981 | Saurenman . |
| 4,319,302 | 3/1982 | Moulden . |
| 4,326,454 | 4/1982 | Saurenman . |
| 4,333,123 | 6/1982 | Moulden . |

FOREIGN PATENT DOCUMENTS

| | | | |
|---|---|---|---|
| 478292 | 11/1951 | Canada | ............................... 361/213 |
| 1028351 | 5/1966 | United Kingdom . | |

*Primary Examiner*—Reinhard J. Eisenzopf
*Attorney, Agent, or Firm*—William W. Haefliger

[57] ABSTRACT

Apparatus to reduce static electricity in a work zone comprises:
(a) first electrical conductor having first tips spaced therealong in a first longitudinal row to dispense positive ions in response to first voltage application to the first conductor,
(b) second electrical conductor having second tips spaced therealong in a second longitudinal row to dispense negative ions in response to second voltage application to the second conductor, the first and second voltages being different, and
(c) a longitudinally elongated, electrically insulative bar mounting the conductors and tips at locations and separations from one another at opposite sides of a divider plate characterized in that static electricity at or proximate the work to be treated is effectively reduced to non-objectionable levels when such differential voltages are applied to the conductors,
(d) the first and second rows being parallel.

1 Claim, 5 Drawing Figures

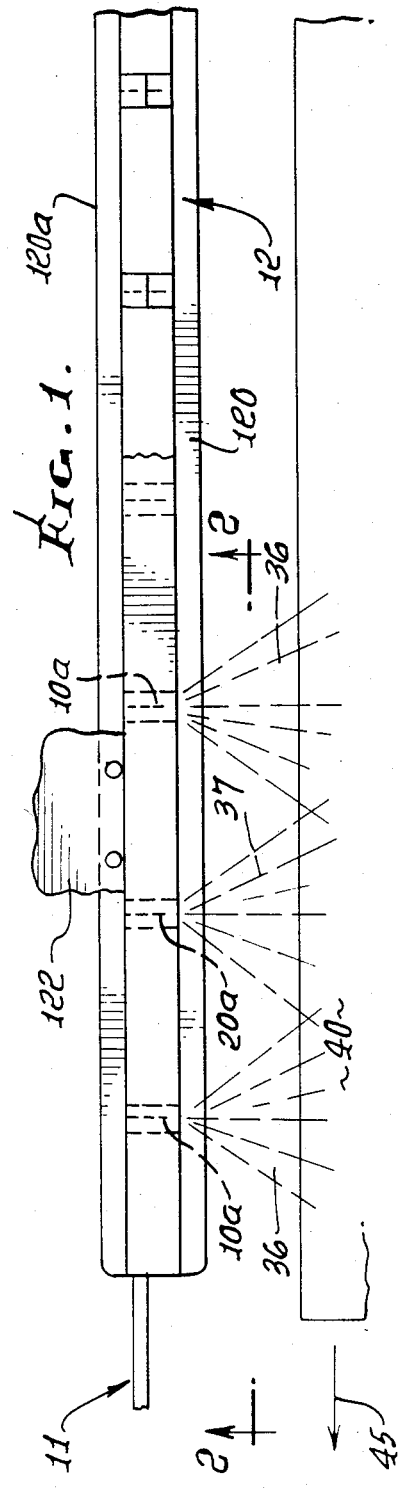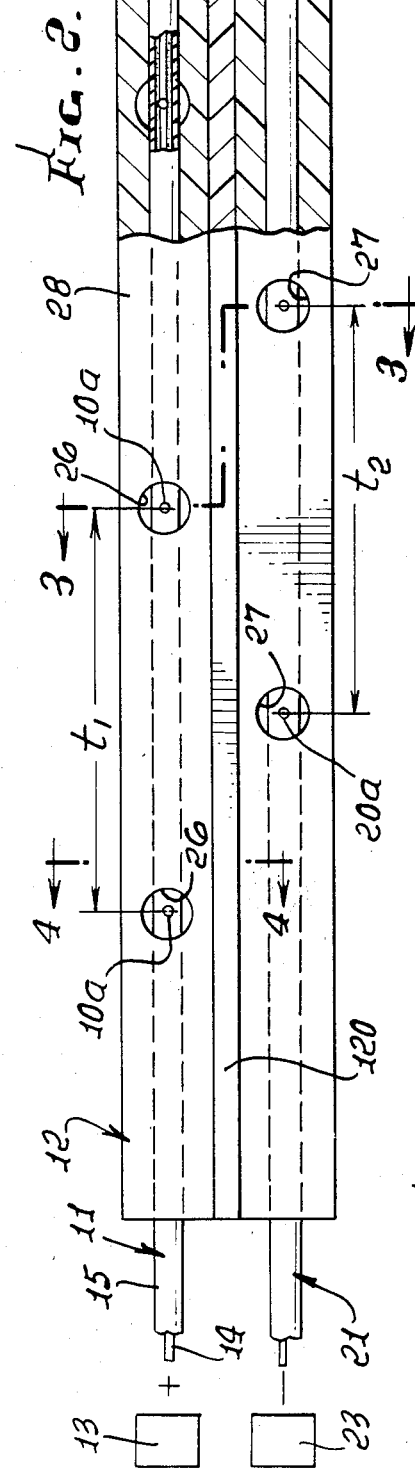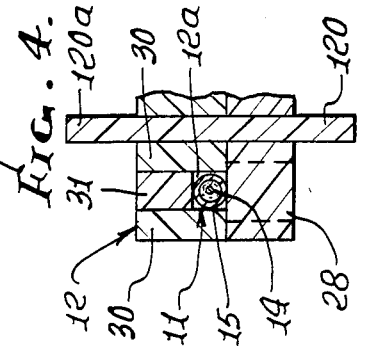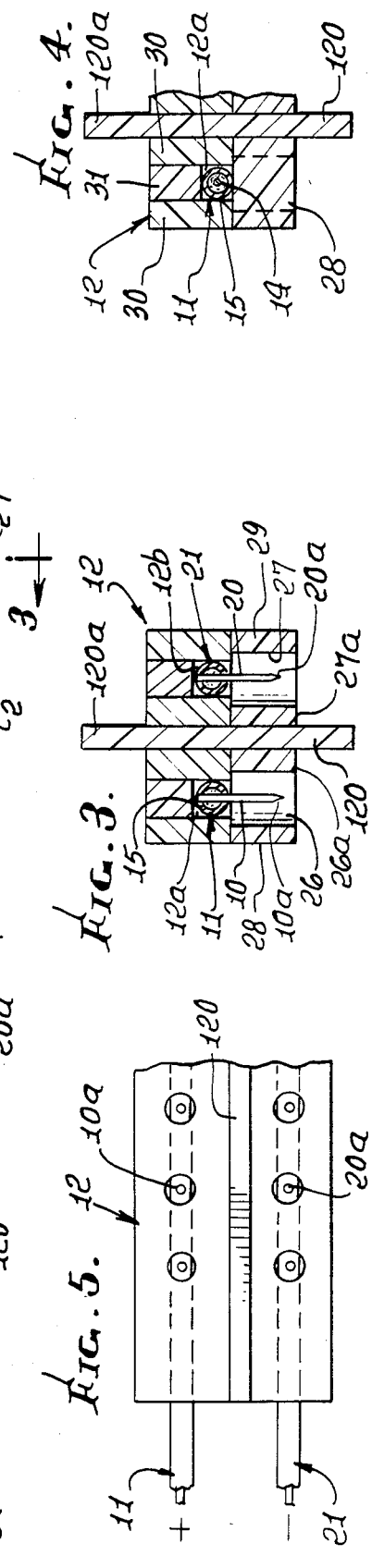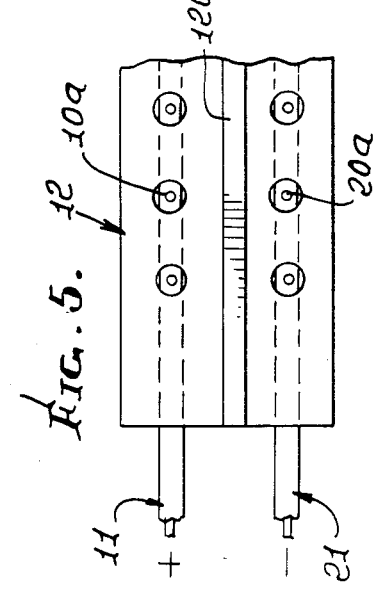

POSITIVE AND NEGATIVE ION DISTRIBUTOR BAR

BACKGROUND OF THE INVENTION

This application is a continuation-in-part of Ser. No. 420,904, filed Sept. 21, 1982, which was a continuation-in-part of Ser. No. 369,925, filed Apr. 19, 1982, which is a continuation-in-part of Ser. No. 290,423, filed Aug. 6, 1981, now U.S. Pat. No. 4,390,923, which is a continuation-in-part of Ser. No. 259,503, filed May 1, 1981, now U.S. Pat. No. 4,388,667, which is a continuation-in-part of Ser. No. 241,684, filed Mar. 9, 1981, which is a continuation-in-part of Ser. No. 124,242, filed Feb. 25, 1980, now U.S. Pat. No. 4,282,830.

This invention relates generally to the provision of conductors with ion dispensing tips or needles, located in zones for treatment of work such as plastic articles, film including photographic film, and electronics parts.

There is need for low cost, efficient means to induce collection of air-borne particles, and to suppress static build-up in certain article treating zones (electric parts production, film cleaning, paper rolling apparatus, surgical operating rooms, clean room assemblies, and circuit board fabrication etc). Prior ion dispensing devices were undesirably complex and not easily installable to conform to special requirements as to product shape, zone size, etc., and often did not achieve desired static neutralization contrary to expectations.

SUMMARY OF THE INVENTION

It is major object of the invention to provide apparatus and method to achieve controlled neutralization or reduction of static charge on or associated with work, or to achieve controlled net positive or negative ion flux in areas at or adjacent to work.

The apparatus of the invention, for neutralizing work surfaces, so that dust and static will not collect thereon, includes:
 (a) first electrical conductor means having first tips spaced therealong in a first longitudinal row to dispense positive ions in response to first voltage application to the first conductor means,
 (b) second electrical conductor means having second tips spaced therealong in a second longitudinal row to dispense negative ions in response to second voltage application to the second conductor means, the first and second voltages being different, and
 (c) a longitudinally elongated, electrically insulative bar mounting said conductor means at locations and separations from one another characterized in that static electricity at or proximate the work to be treated is effectively reduced to non-objectionable levels when such differential voltages are applied to the conductor means,
 (d) the first and second rows being parallel.

As will appear, the rows of tips, which may be formed by needles, are located in first and second recesses defined by bar sections, these recesses typically extending in closely separated parallel relation, with a barrier plate therebetween and carrying the bar sections, whereby work surfaces close to the recesses may be exposed to both positive and negative ions, simultaneously, for neutralization of work surfaces. Two planes of jetted ions are typically provided, in "knife-like" patterns, and serve to completely clean dust particles off work surfaces.

These and other objects and advantages of the invention, as well as the details of an illustrative embodiment, will be more fully understood from the following description and drawings, in which:

DRAWING DESCRIPTION

FIG. 1 is a top side elevation showing apparatus incorporating the invention;
FIG. 2 is a frontal elevation on lines 2—2 of FIG. 1;
FIG. 3 is a section on lines 3—3 of FIG. 2;
FIG. 4 is a section on lines 4—4 of FIG. 2; and
FIG. 5 is a view like FIG. 2, showing a modification.

DETAILED DESCRIPTION

In FIGS. 1-3, first electrical conductor means is provided to have first tips spaced therealong, and in a first row, to dispense positive ions in response to first voltage application to the first conductor means. In these views, the first tips $10a$ are typically formed by electrically conductive needles 10 extending parallel to one another in a first row. High voltage is supplied to the needles 10 from a conductor such as a cable 11 sidewardly located and projecting from the needle support body 12 and extending to a positive voltage source 13. FIGS. 3 and 4 show the cable 11 as having an electrically conductive core 14, and insulative sheath 15 thereon. The needles are pressed into the cable to fully and sidewardly contact the core. The needles typically project through the cable, as shown.

Second electrical conductor means is also provided to have second tips spaced therealong, and in a second row to dispense negative ions in response to second voltage application to the second conductor means. As illustrated for example, the second tips $20a$ are typically formed by electrically conductive needles 20 extending parallel to one another in a second row. The row of needles 10 is generally parallel to row 20 for best results. High voltage is supplied to the needles 20 from a second conductor such as cable 21 projecting from body 12 and extending to a negative voltage source 23. Cable 21 has a construction like cable 11, and the needles 20 project through cable 21 in the same manner that needles 10 project through cable 11. Cables 11 and 21 are flexible so as to turn and extend about corners, outside the bar.

The voltage sources 13 and 23 may supply voltages such that positive voltage between 1,000 and 100,000 volts DC is supplied at tips $10a$, and an approximately equal but negative voltage between $-1,000$ and $-100,000$ volts DC is supplied at tips $20a$, and at the same time or approximately so. A usable voltage source is disclosed in U.S. Pat. No. 3,308,344.

The body 12 typically consists of molded plastic, electrically insulative, material (one example being polypropylene), and forms at least one and typically two chambers $12a$ and $12b$ therein. As shown in FIG. 3, the two chambers respectively receive the two cables 11 and 21 from which the needles project forwardly into corresponding recesses 26 and 27 formed in one side of the body, tips $10a$ and $20a$ projecting in or exposed in the recesses, but spaced inwardly from outer walls $26a$ and $27a$; thus they are protected from inadvertent finger contact. Recesses $26a$ and $27a$ extend in parallel rows corresponding to the two rows of tips, with a separating divider 120 therebetween. The recesses are typically cylindrical and formed in body plates 28 and 29, with recesses 26 spaced apart longitudinally at center-to-center distances $t_1$, and recesses 27 spaced apart longitudinally at center-to-center distances $t_2$. The distances $t_1$ and $t_2$ are typically equal, and recesses 26 are spaced laterally from the approximately half way points between recesses 27. Thus, positive and negative ion distribution over the same area is enhanced.

Note that bar 12 includes like sections at opposite sides of the divider plate, each section including a front plate as at 28, two side plates 30, and a medial plate 31. Plates 30 and 31 can be integral, i.e. formed of the same plastic block material. Each such section is attached to a side of the divider plate 120, as by adhesive. Rearward projecting extent 120a of plate 120 is useful for attachment to room structure as at 122.

Air is carried forwardly by the ions dispersed forwardly from the needles and the recesses. The air and ions sweep as at 36 and 37 across work surfaces, as at 40, and dust particles are neutralized by the ions contacting the work surfaces and particles. With positive ions 36 directed at such surfaces, and negative ions 37 directed at the surfaces, it is found that the surfaces are electrically neutralized, with consequent static removal. Therefore, dust particles no longer statically cling to the surfaces. Thus, a highly effective "air-knife" effect is created. The work can also be passed in the direction indicated by arrow 45 in FIG. 1 past the two rows of tips, with static neutralizing effect.

FIG. 5 shows a modification wherein the construction is the same as in FIGS. 1-4; however, the needle tips 10a are laterally oppositely spaced from tips 20a.

I claim:

1. In apparatus for reducing static electricity on work surfaces, the combination that includes:
    (a) first electrical conductor means having first tips spaced therealong in a first longitudinal row to dispense positive ions in response to first voltage application to the first conductor means,
    (b) second electrical conductor means having second tips spaced therealong in a second longitudinal row to dispense negative ions in response to second voltage application to the second conductor means, the first and second voltages being different, and
    (c) a longitudinally elongated, electrically insulative bar mounting said conductor means at locations and separations from one another characterized in that static electricity at or proximate the work to be treated is effectively reduced to non-objectionable levels when such differential voltages are applied to the conductor means,
    (d) the first and second rows being parallel, said tips being in first and second recesses, respectively, defined by the bar,
    (e) the first conductor means including a first conductor adapted to have positive voltage applied thereto, and the second conductor means includes a second conductor adapted to have negative voltage applied therebetween, the conductors located within said bar, and being flexible, said bar including first and second bar sections, said first section defining said first recesses and said second section defining said second recesses, said sections consisting of electrically insulative plastic material,
    (f) each section defining a chamber receiving one of said conductors adjacent the recesses, each conductor including an electrically conductive core and an insulative sheath thereon, the needles pressed through said cores to sidewardly adhere to the core,
    (g) the bar further including a divider plate,
    (h) said sections mounted along opposite sides of the divider plate so that the first recesses are staggered relative to the second recesses.

* * * * *